(12) United States Patent
Ross

(10) Patent No.: US 7,620,556 B1
(45) Date of Patent: Nov. 17, 2009

(54) TELECOMMUNICATIONS SYSTEM FOR BROADCASTING AND RECEIVING INFORMATION WHOSE PERTINENCE IS AT LEAST PARTIALLY BASED ON GEOGRAPHY

(75) Inventor: Paul C. Ross, Morris Plains, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1408 days.

(21) Appl. No.: 09/735,335

(22) Filed: Dec. 11, 2000

(51) Int. Cl.
*G06Q 99/00* (2006.01)
(52) U.S. Cl. .......................................................... 705/1
(58) Field of Classification Search ....................... 705/1
See application file for complete search history.

(56) References Cited

U.S. PATENT DOCUMENTS

| | | | | |
|---|---|---|---|---|
| 5,559,520 | A * | 9/1996 | Barzegar et al. | 342/357.1 |
| 5,636,245 | A * | 6/1997 | Ernst et al. | 375/259 |
| 5,969,678 | A * | 10/1999 | Stewart | 342/457 |
| 5,991,739 | A | 11/1999 | Cupps et al. | |
| 6,052,591 | A * | 4/2000 | Bhatia | 455/445 |
| 6,169,894 | B1 * | 1/2001 | McCormick et al. | 455/414.1 |
| 6,434,477 | B1 * | 8/2002 | Goss et al. | 701/117 |
| 6,453,230 | B1 * | 9/2002 | Geurts | 701/117 |
| 6,545,596 | B1 * | 4/2003 | Moon | 340/425.5 |
| 6,650,902 | B1 * | 11/2003 | Richton | 455/456.3 |
| 6,731,940 | B1 * | 5/2004 | Nagendran | 455/456.1 |
| 2004/0076279 | A1 * | 4/2004 | Taschereau | 379/218.01 |

FOREIGN PATENT DOCUMENTS

WO    WO 0176173 A2 * 10/2001

OTHER PUBLICATIONS

"InfoMove Partners with Etak and University of Washington to Deliver Real-Time Traffic Information to the Car via Wireless Internet," Business Wire, Jan. 5, 2000.*
Mack, Ann M., "Going Local," Brandweek, Jul. 10, 2000.*
"SigmaOne and InirU to test and Jointly Market Wireless Location-Based Application; Retailers Will Be Able to Reach Out to Nearby Potential Customer Through Wireless Phones," Business Wire, Nov. 8, 2000.*

* cited by examiner

*Primary Examiner*—Jonathan Ouellette
(74) *Attorney, Agent, or Firm*—Priest & Goldstein PLLC

(57) ABSTRACT

A telecommunications terminal is disclosed that comprises: a receiver for receiving a geographically-sensitive message and an indicium of a geographic location of relevance; means for ascertaining a geographic location of the telecommunications terminal; and a processor for determining a geographic region of interest based on the geographic location of the telecommunications terminal, for determining whether the geographic location of relevance is within the geographic region of interest, and for disregarding the geographically-sensitive message when the geographic location of relevance is not within the geographic region of interest.

28 Claims, 10 Drawing Sheets

TELECOMMUNICATIONS SYSTEM FOR BROADCASTING AND RECEIVING INFORMATION WHOSE PERTINENCE IS AT LEAST PARTIALLY BASED ON GEOGRAPHY

FIELD OF THE INVENTION

The present invention relates to telecommunications in general, and, more particularly, to a telecommunications system for disseminating, receiving, and segregating information whose pertinence is at least partially based on geography.

BACKGROUND OF THE INVENTION

In our society most people are overwhelmed by the deluge of information that is delivered to them. Every day, newspapers, magazines, television, radio, and the Internet each provide more information than any person could ever assimilate. The problem is exacerbated by the fact that each of these media, albeit to different degrees, deliver information to people for whom that information is unlikely to be of interest, and, therefore, each person must spend a considerable amount of time and effort just culling information of interest from information that is not of interest.

Increasingly, technological solutions are employed to cull information that is likely to be of interest to a given person from information that is unlikely to be of interest. For example, some Web sites enable a user to custom tailor a daily electronic "newspaper" that only contains news items that relate to the user's interests. In these cases, the information is filtered based on the nature of its content. For example, a user could indicate that he or she desires news relating to business but not news relating to sports.

Another criterion for culling information that might be of interest to a user from information that is unlikely to be of interest is based on geography. By its very nature, the utility of some kinds of information is at least partially related to geography. For example, a report of traffic congestion on the Golden Gate Bridge is more likely to be of use to those in the San Francisco Bay metropolitan area than it is to people in New Zealand.

Traditionally, each type of media has, to one extent or another, naturally culled out geographically-sensitive information that is unlikely to be of interest to its audience. For example, most newspapers have editorial policies that prefer information about the area where they are published than information about distant areas. In contrast, many Internet Web sites tend to be much less parochial, which is, of course, both the weakness and the strength of the Internet.

Although some technological solutions exist for culling information based on geography, the need clearly exists for improved systems that cull geographically-sensitive information that is likely to be desired from geographically-sensitive information that is unlikely to be desired.

SUMMARY OF THE INVENTION

Embodiments of the present invention disseminate and receive information that is geographically-sensitive without some of the costs and disadvantages of techniques in the prior art. For example, the illustrative embodiment of the present invention is advantageous because it ameliorates the information overload experienced by many people while seeking to ensure that they receive the geographically-sensitive information that is likely to be of interest to them.

The illustrative embodiment of the present invention comprises a telecommunications base station and one or more telecommunications terminals. The telecommunications base station broadcasts:
1. a geographically-sensitive message, and
2. an indication of where that message is considered more relevant, and
3. a priority of the message, and
4. a designation of the nature of the content to all of the telecommunications terminals within its purview.

A telecommunications terminal in accordance with the illustrative embodiment of the present invention advantageously determines its own location and determines a geographic region of interest, which defines the geographic area of interest of geographically-sensitive information for the telecommunications terminal. Thereafter, if there is one common point between where the geographically-sensitive message is considered more relevant and the geographic region of interest, then the telecommunications terminal preserves the geographically-sensitive message for presentation to a user of the telecommunications terminal; otherwise, the telecommunications terminal disregards the message. Furthermore, if the designation of the nature of the content of the message indicates that the subject matter of the message is something that is not of interest to the user of the telecommunications terminal, then the telecommunications terminal disregards the message.

Advantageously, the scope of the geographic region of interest is based on:
1. the location of the telecommunications terminal, or
2. the direction of motion (either instantaneous or time-averaged) of the telecommunications terminal, if it is mobile, or
3. the speed (either instantaneous or time-averaged) of the telecommunications terminal, if it is mobile, or
4. the priority of the geographically-sensitive message, or
5. the nature of the desired content, or
6. any combination of i, ii, iii, iv, or v.

The illustrative embodiment of the present invention comprises: a receiver for receiving a geographically-sensitive message and an indicium of a geographic location of relevance; means for ascertaining a geographic location of the telecommunications terminal; and a processor for determining a geographic region of interest based on the geographic location of the telecommunications terminal, for determining whether the geographic location of relevance is within the geographic region of interest, and for disregarding the geographically-sensitive message when the geographic location of relevance is not within the geographic region of interest.

DETAILED DESCRIPTION

Figure 1:
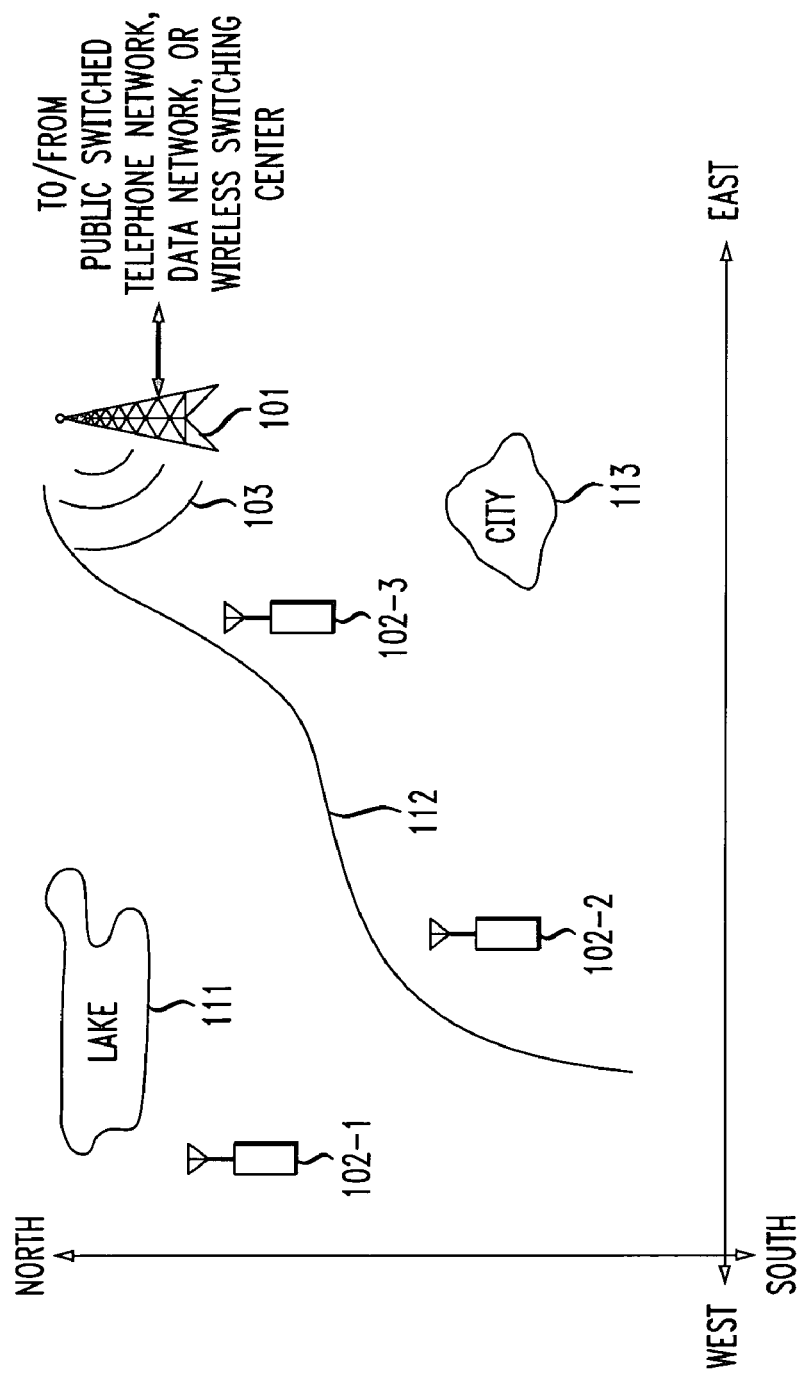
FIG. 1 depicts a map of an illustrative geographic area in which the illustrative embodiment of the present invention operates.

FIG. 1 depicts a map of an illustrative geographic area that provides the context in which the illustrative embodiment of the present invention operates. Map 100 depicts: telecommunications base station 101, a plurality of telecommunications terminals 102-$i$ (wherein i=1 to 3), lake 111, highway 112, and city 113. It will be clear to those skilled in the art how to make and use embodiments of the present invention that function in a different geographic area and that comprise a different number of telecommunications base stations or a different number of telecommunications terminals or both.

Telecommunications base station 101 can interact with telecommunications terminal 102-$i$ via wireline (e.g., copper local loop, optical fibers, etc.) or wireless (e.g., radio, etc.). In the case where telecommunications base station 101 communicates via wireline technology, it is terrestrially based. In the case where telecommunications base station 101 communicates via wireless technology, it can be terrestrial, airborne or space-based (i.e., a satellite).

Telecommunications terminal 102-$i$ can be mobile or fixed. In the case where telecommunications base station 101 communicates via wireline technology with a telecommunications terminal, both the telecommunications base station and the telecommunications terminal are advantageously fixed.

Figure 2:
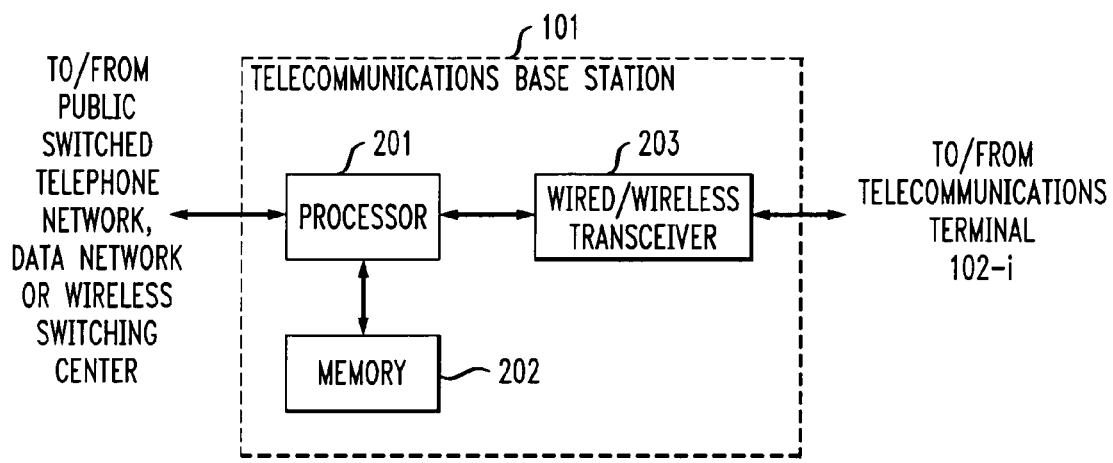
FIG. 2 depicts a block diagram of the salient components of telecommunications base station 101.

FIG. 2 depicts a block diagram of the salient components of telecommunications base station 101, which comprises: processor 201, memory 202, and wired/wireless transceiver 203. Telecommunications base station 101 interacts with the public switched telephone network (i.e., the "PSTN"), a data network (e.g., the Internet, etc.), or a wireless switching center, in well-known fashion. Processor 201 can be either a general-purpose processor or a special-purpose processor that is capable of performing the functionality described herein and with respect to FIGS. 4, 5, and 9. Memory 202 is advantageously a non-volatile storage device (e.g., semiconductor RAM, hard disk, etc.) that holds the programs and data used by processor 201. Wired/wireless transceiver 203 comprises the equipment necessary to enable telecommunications base station 101 to communicate with telecommunications terminal 102-$i$. It will be clear to those skilled in the art how to make and use processor 201, memory 202, and wired/wireless transceiver 203.

Figure 3:
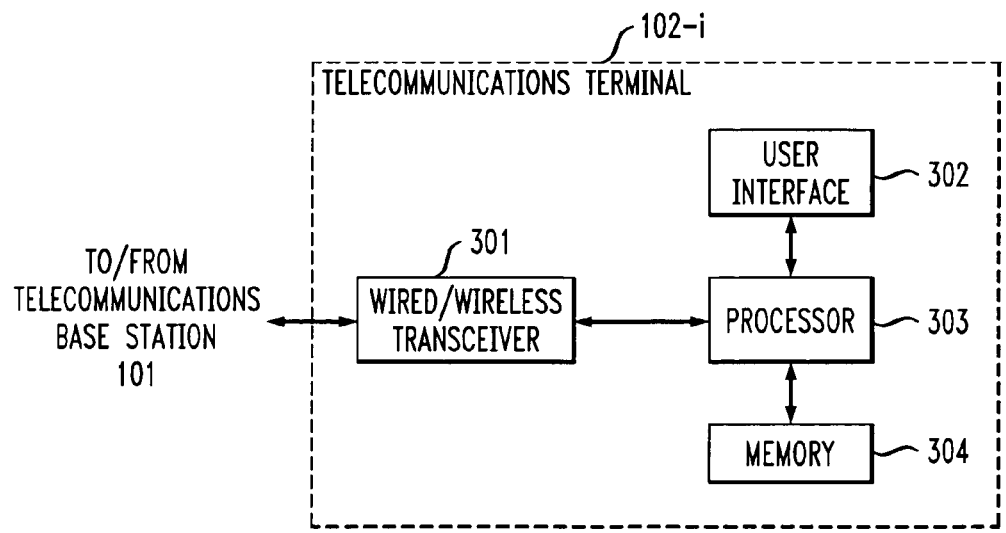
FIG. 3 depicts a block diagram of the salient components of telecommunications terminal 102-i.

FIG. 3 depicts a block diagram of the salient components of telecommunications terminal 102-$i$, which comprises: wired/wireless transceiver 301, user interface 302, processor 303, and memory 304. Wired/wireless transceiver 301 comprises the equipment necessary to enable telecommunications terminal 102-$i$ to communication with telecommunications base station 101. User interface 302 comprises the equipment (e.g., a speaker, a microphone, a visual display, a keypad, etc.) necessary to enable telecommunications terminal 102-$i$ to interact with a user (e.g., a natural person, etc.) of telecommunications terminal 102-$i$. Processor 303 can be either a general-purpose processor or a special-purpose processor that is capable of performing the functionality described herein and with respect to FIGS. 4, 8, and 13. Memory 304 is advantageously a non-volatile storage device (e.g., semiconductor RAM, hard disk, etc.) that holds the programs and data used by processor 303. It will be clear to those skilled in the art how to make and use wired/wireless transceiver 301, user interface 302, processor 303, and memory 304.

Figure 4:
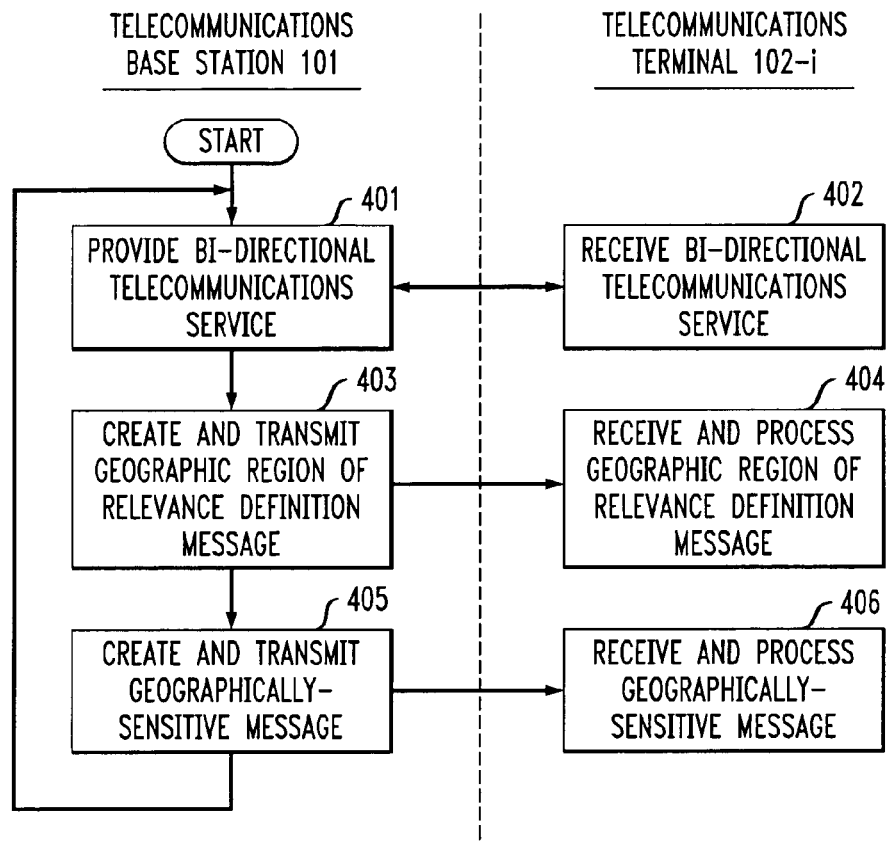
FIG. 4 depicts a flowchart of the operation of the illustrative embodiment of the present invention.

FIG. 4 depicts a flowchart of the operation of the illustrative embodiment of the present invention.

At step 401, telecommunications base station 101 provides bi-directional telecommunications service to telecommunications terminal 102-$i$, and at step 402, telecommunications terminal 102-$i$ receives bidirectional telecommunications service. To provide bi-directional telecommunications service, telecommunications base station 101 transmits, in well-known fashion, two kinds of messages:

1. traffic messages, which are directed to a specific telecommunications terminal, but that might be received by other telecommunications terminals which disregard those traffic messages not directed to them; and
2. overhead, administrative, and maintenance messages, which are directed to either: (i) a specific telecommunications terminal, or (ii) not directed to a specific telecommunications terminal but to any unspecific telecommunications terminal in the purview of telecommunications base station 101.

Because it is well-known to those skilled in the art how to make and use telecommunications base station 101 and telecommunications terminal 102-$i$ to provide bi-directional telecommunications service, this aspect of the illustrative embodiment need not be discussed further.

At step 403, telecommunications base station 101 creates and transmits one or more geographic region of relevance definition messages to all of the telecommunications terminals within its purview.

For the purposes of this specification, a "geographic region of relevance definition message" is defined as a message that defines a geographic region of relevance. For the purpose of this specification, a "geographic region of relevance" is defined as an area in which a geographically-sensitive message is relevant. For the purposes of this specification, a "geographically-sensitive message" is defined as a message whose pertinence is at least partially based on geography.

Figure 5:
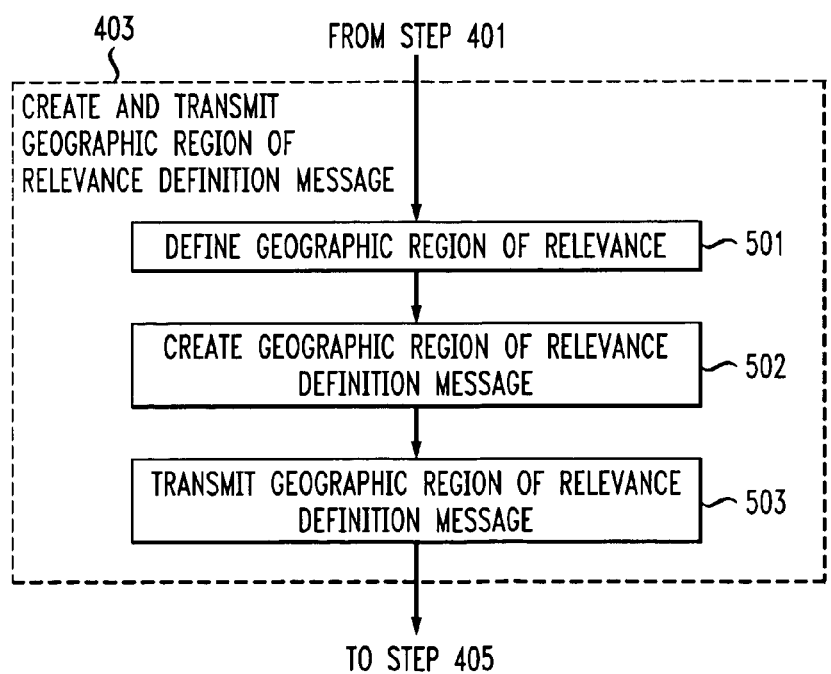
FIG. 5 depicts a flowchart of the component of step 403.

FIG. 5 depicts a flowchart of the component of step 403.

At step 501, telecommunications base station 101 defines one or more geographic regions of relevance. In accordance with the illustrative embodiment of the present invention, a geographic region of relevance can be defined by:

1. a polygon (e.g., a triangle, a rectangle, an irregular concavo-convex polygon, etc.), or
2. a conic section (e.g., a circle, an ellipse, etc.), or
3. a composite of at least one polygon and at least one ellipse.

As is well-known to those skilled in the art, a polygon is unambiguously defined by three non-collinear unordered points or by three or more non-collinear ordered points on a surface. Therefore, in accordance with the illustrative embodiment of the present invention, a geographic region of relevance that is defined by a single polygon is advantageously defined by three unordered geographic locations or by three or more ordered geographic locations on a surface. For the purposes of this specification, a "geographic location" is defined as a position on the surface of the earth. Typically, a geographic location is represented by the latitude and a longitude.

As is also well-known to those skilled in the art, a conic section can be defined in a variety of ways depending on the exact nature (e.g., a circle, an ellipse, etc.) of the conic section, but that in all cases, each conic section can be defined in terms of one or more points, and, therefore, a geographic region of relevance that is defined by a conic section is defined by one or more geographic locations.

Typically, although not necessarily, each geographic region of relevance corresponds to a political or geographic feature (e.g., a lake, a highway, a city, etc.) that might naturally be the subject of a geographically-sensitive message.

Figure 6:
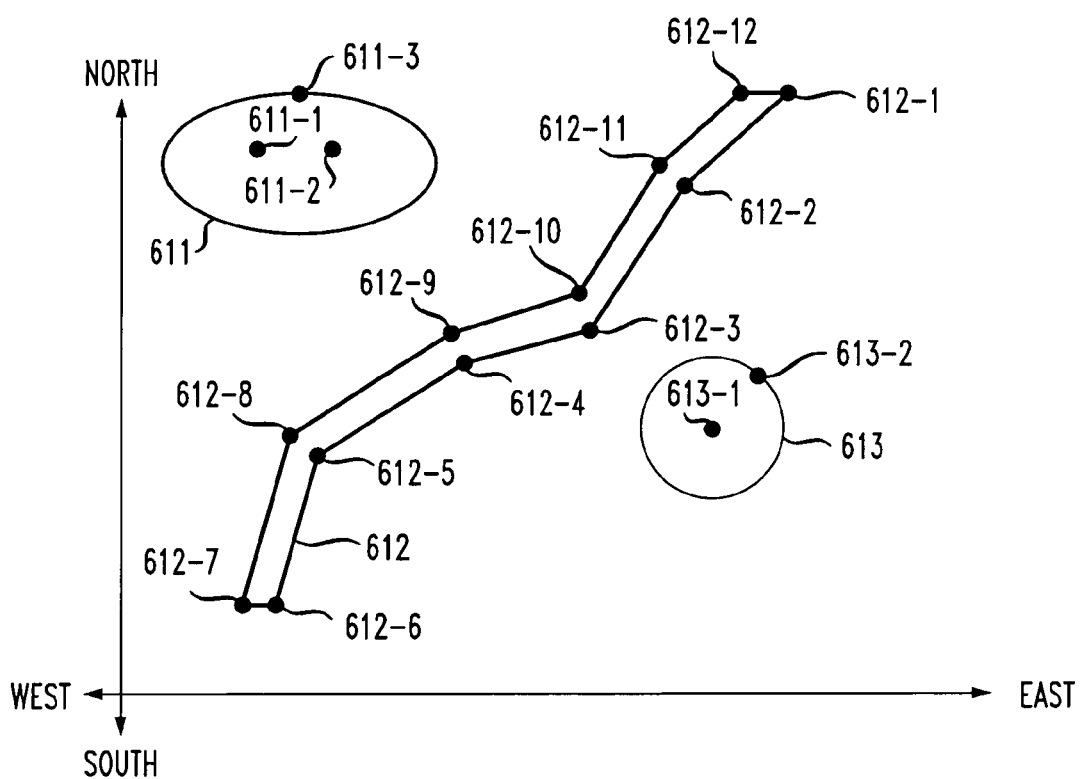
FIG. 6 depicts a map that comprises three geographic regions of relevance.

FIG. 6 depicts a map that comprises three geographic regions of relevance. Geographic region of relevance 611 corresponds roughly in scope to lake 111 depicted in FIG. 1 and is defined by the two foci (i.e., geographic locations 611-1 and 611-2) of an ellipse and one point on the ellipse (i.e., geographic location 611-3). Geographic region of relevance 612 corresponds roughly in scope to highway 112 depicted in FIG. 1 and is defined by a polygon of twelve ordered geographic locations (i.e., geographic locations 612-1 through 612-12). Geographic region of relevance 613 corresponds roughly in scope to the city limits of city 113 depicted in FIG. 1 and is defined by the center (i.e., geographic location 613-1) of a circle and one point on the circle (i.e., geographic location 613-2). It will be clear to those skilled in the art how to define one or more geographic regions of relevance.

At step 502 in FIG. 5, telecommunications base station 101 creates one or more geographic region of relevance definition messages. The purpose of a geographic region of relevance definition message is to enable telecommunications base station 101 to:

i. convey the definition of a geographic region of relevance to all of the telecommunications terminals within the purview of telecommunications base station 101, and ii. to incorporate that definition by reference in a geographically-sensitive message at a later time, which obviates the necessity of explicitly defining a geographic region of relevance in each geographically-sensitive message.

For example, a geographic region of relevance definition message enables telecommunications base station 101 to definite a geographic region of relevance as the three city-block area surrounding Times Square in Manhattan and to associate that geographic region of relevance with the indicium "NYC44B." Thereafter, telecommunications base station 101 can broadcast a geographically-sensitive message that includes the indicium "NYC44B" and the message "gridlock alert in theater district, use mass transit," and a telecommunications terminal that receives the geographically-sensitive message will understand the scope of relevance for that message.

Figure 7:
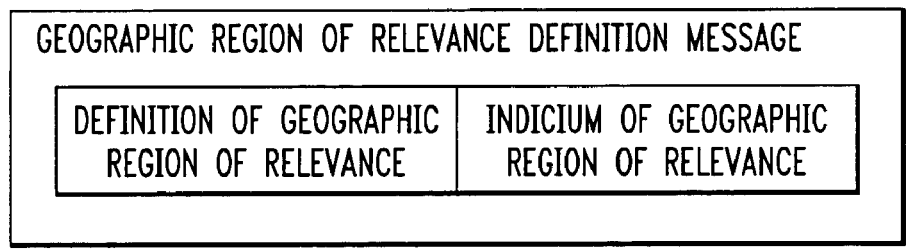
FIG. 7 depicts the format of a geographic region of relevance definition message in accordance with the illustrative embodiment.

FIG. 7 depicts the format of a geographic region of relevance definition message in accordance with the illustrative embodiment, which comprises: (1) a definition of a geographic region of relevance, and (2) an indicium of a geographic region of relevance.

At step 503, telecommunications base station 101 transmits one or more geographic region of relevance definition messages to telecommunications terminal 102-$i$. It will be clear to those skilled in the art how to transmit the geographic region of relevance definition messages to telecommunications terminal 102-$i$.

At step 404, telecommunications terminal 102-$i$ receives and processes the geographic region of relevance definition messages transmitted in step 403.

Figure 8:
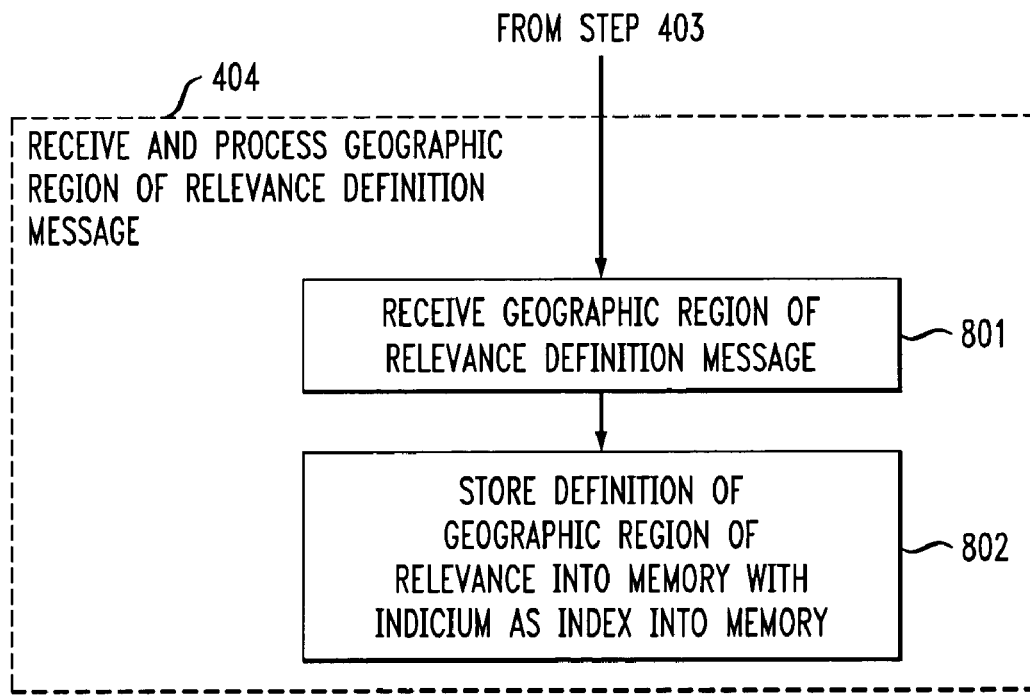
FIG. 8 depicts a flowchart of the components of step 404.

FIG. 8 depicts a flowchart of the components of step 404.

At step 801, telecommunications terminal 102-$i$ receives a geographic region of relevance definition message, which as shown in FIG. 7 comprises: (1) a definition of a geographic region of relevance, and (2) an indicium of a geographic region of relevance.

At step 802, telecommunications terminal 102-$i$ stores the definition of the geographic region of relevance into memory 304 with the indicium of the geographic region of relevance as the index into memory 304.

Table 1 depicts an illustrative data structure in memory 304 that comprises the definitions of the three geographic regions of relevance depicted and defined in FIG. 6.

TABLE 1

| Indicium of Geographic Region of Relevance | Definition of Geographic Region of Relevance |
|---|---|
| JPD91859 | Ellipse with foci at geographic locations 611-1 and 611-2 and geographic location 611-3 on the ellipse. |
| SMGFD7623 | Polygon with twelve ordered geographic locations 612-1 through 612-12. |
| . . . | . . . |
| LJD61121 | Circle with center at geographic location 613-1 and geographic location 613-2 on the circle. |

At step 405, telecommunications base station 101 creates and transmits one or more geographically-sensitive messages.

Figure 9:
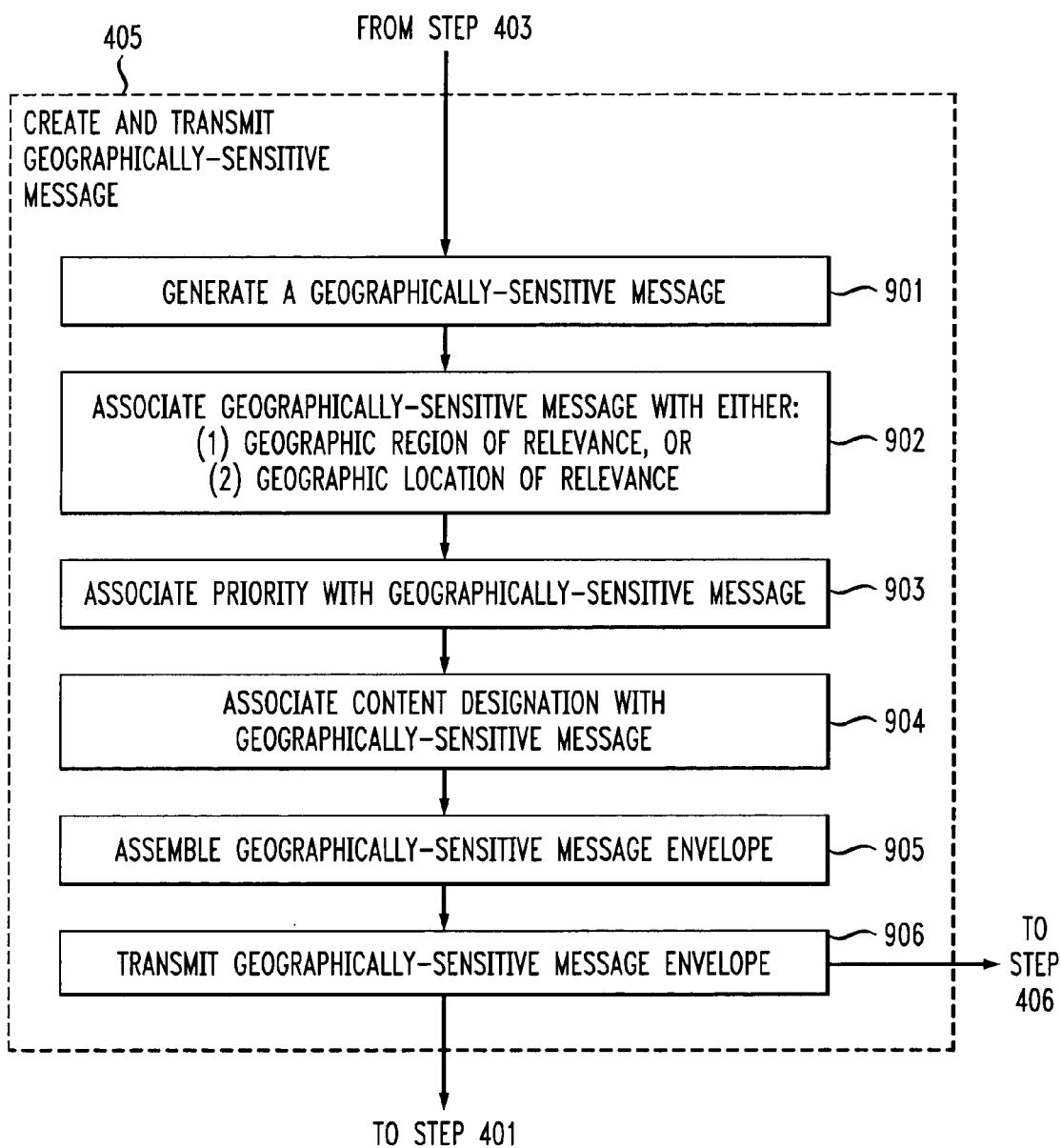
FIG. 9 depicts a flowchart of the components of step 405.

FIG. 9 depicts a flowchart of the components of step 405.

At step 901, telecommunications base station 101 generates a geographically-sensitive message. Alternatively, telecommunications base station 101 receives the geographically-sensitive message from another entity (not shown) via the public switched telephone network, a data network, or a wireless switching center. Advantageously, the subject matter of the geographically-sensitive message is chosen so that it might be of interest to a user of a telecommunications terminal within the purview of telecommunications base station 101. For example, the subject matter might relate to the weather in a particular city, the traffic conditions on a particular highway, or a sale at a particular restaurant.

At step 902, telecommunications base station 101 associates the geographically-sensitive message with either:

1. a geographical region of relevance, or
2. a geographic location of relevance.

For the purposes of this specification, a "geographic location of relevance" is defined as the site at which a geographically-sensitive message is intended as germane. In accordance with the illustrative embodiment of the present invention, a geographic location of relevance is represented by the latitude and a longitude of the site.

In other words, telecommunications base station 101 can decide to associate the geographically-sensitive message with either:

1. an area, as represented by a geographical region of relevance, or 2. a site, as represented by a geographic location of relevance.

This is because some subject matter may be more relevant to an area than to a site while other subject matter is more relevant to a site that to an area.

Alternatively, telecommunications base station 101 receives the association of the geographically-sensitive message with either a geographical region of relevance or a geographic location of relevance from another entity (not shown) via the public switched telephone network, a data network, or a wireless switching center.

At step 903, telecommunications base station 101 determines a priority of the geographically- sensitive message. This priority level will assist telecommunications terminal 102-*i* in determining whether to deliver the geographically-sensitive message to its user or whether to disregard the geographically-sensitive message. For example, a geographically-sensitive message concerning a sale at store in geographic region of relevance 613 (i.e., city 113 in FIG. 1) should probably be assigned a lower priority than a geographically-sensitive message concerning a tornado in geographic region of relevance 613.

Alternatively, telecommunications base station 101 receives the priority of the geographically-sensitive message from another entity (not shown) via the public switched telephone network, a data network, or a wireless switching center.

At step 904, telecommunications base station 101 associates the geographically-sensitive message with a content designation. For example, if the geographically-sensitive message pertains to the New York Yankees, the content designation might be "Major League Baseball" or "baseball." The purpose of the content designation is to assist telecommunications terminal 102-*i* in culling geographically-sensitive messages not only on their geographic pertinence, but also on the nature of their content. It will be clear to those skilled in the art how to generate content designations and how to associate geographically-sensitive messages with a content designation.

At step 905, telecommunications base station 101 assembles the geographically-sensitive message, an indicium of the priority of the geographically-sensitive message, and advantageously one of:

1. an indicium of a geographical region of relevance, or
2. an indicium of a geographic location of relevance, or
3. an explicit definition of a geographical region of relevance, into a geographically-sensitive message envelope.

Alternatively, telecommunications base station 101 receives the geographically-sensitive message envelope from another entity (not shown) via the public switched telephone network, a data network, or a wireless switching center.

Figure 10:
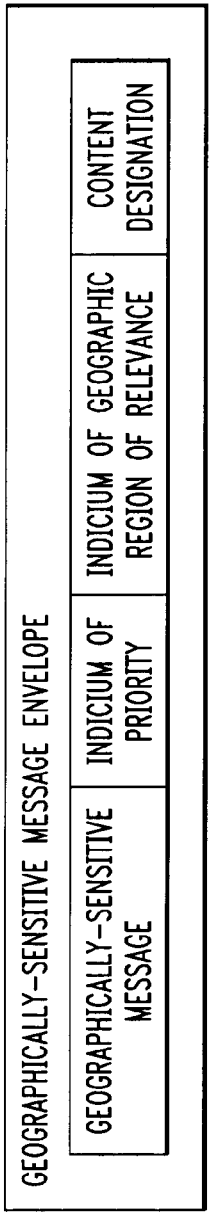
FIG. 10 depicts a block diagram of a first geographically-sensitive message envelope in accordance with the illustrative embodiment.

FIG. 10 depicts a block diagram of a first geographically-sensitive message envelope in accordance with the illustrative embodiment, which comprises an indicium of a geographical region of relevance. This envelope is useful when telecommunications base station 101 has previously created and transmitted a definition of the geographic region of relevance associated with the geographically-sensitive message.

Figure 11:
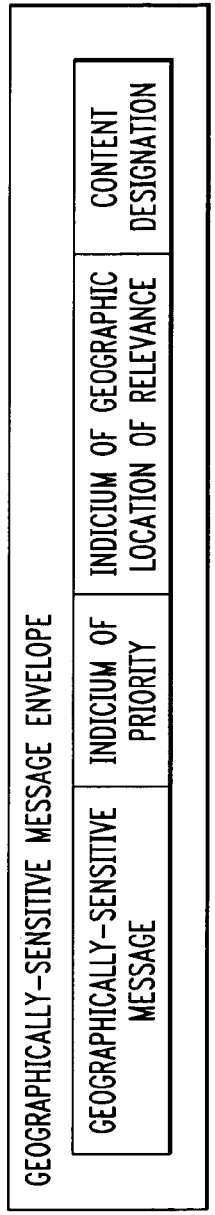
FIG. 11 depicts a block diagram of a third geographically-sensitive message envelope in accordance with the illustrative embodiment.

FIG. 11 depicts a block diagram of a second geographically-sensitive message envelope in accordance with the illustrative embodiment, which comprises an indicium of a geographic location of relevance. Advantageously, the indicium of a geographic location of relevance is represented in terms of latitude and longitude.

Figure 12:
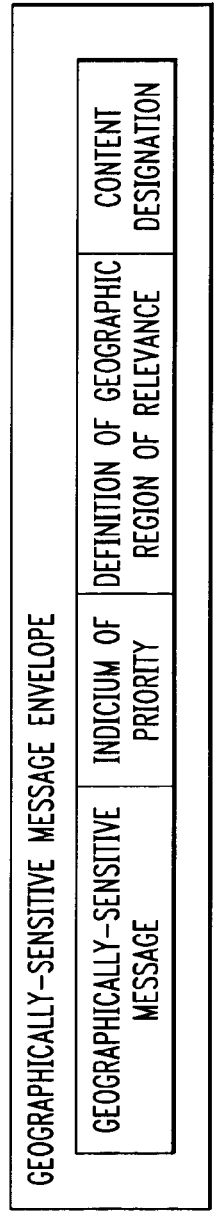
FIG. 12 depicts a block diagram of a second geographically-sensitive message envelope in accordance with the illustrative embodiment.

FIG. 12 depicts a block diagram of a third geographically-sensitive message envelope in accordance with the illustrative embodiment, which comprises an explicit definition of a geographical region of relevance. This envelope is useful when telecommunications base station 101 has not previously transmitted a definition of the geographic region of relevance associated with the geographically-sensitive message. With this envelope, telecommunications base station 101 can transmit an explicit definition of a geographical region of relevance with the geographically-sensitive message. This is particularly useful for emergency messages in which there has been no prior opportunity to define the geographic region of relevance. As with respect to the geographic region of relevance definition message depicted in FIG. 7, the explicit definition of a geographical region of relevance with the geographically-sensitive message is defined by:

1. a polygon, or
2. a conic section, or
3. a composite of at least one polygon and at least one ellipse.

At step 906, telecommunications base station 101 transmits the geographically-sensitive message envelope to all of the telecommunications terminals within its purview.

Figure 13:
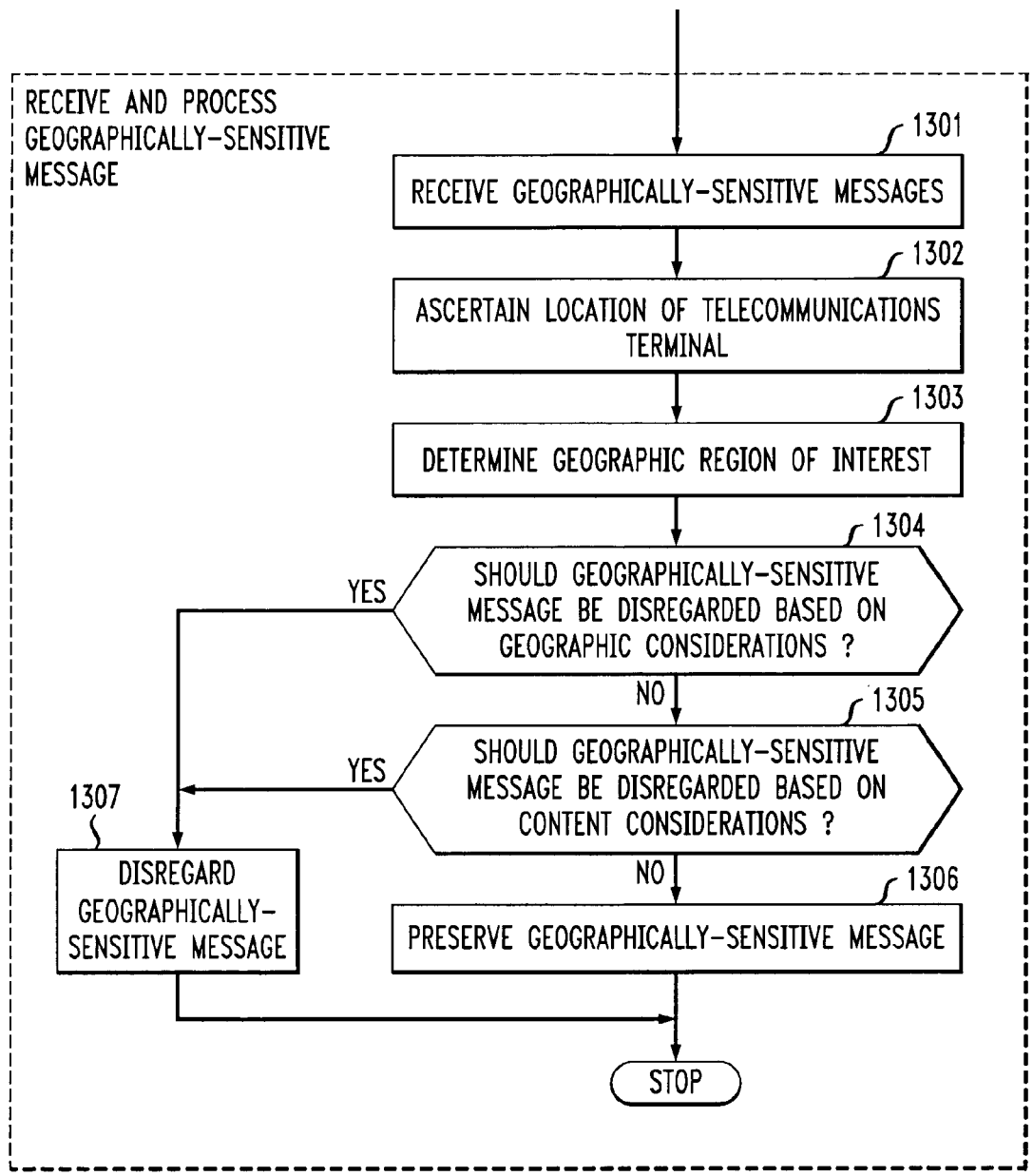
FIG. 13 depicts a flowchart of the components of step 406.

FIG. 13 depicts a flowchart of the components of step 406.

At step 1301, telecommunications terminal 102-*i* receives a geographically-sensitive message, as transmitted in step 905.

At step 1302, telecommunications terminal 102-*i* ascertains its own location, and, if it is moving, its instantaneous and time-averaged direction of motion and its instantaneous and time-averaged speed. It will be clear to those skilled in the art how to enable telecommunications terminal 102-*i* to ascertain this information. For example, telecommunications terminal 102-*i* can use a global positioning system receiver to ascertain this information.

At step 1303, telecommunications terminal 102-*i* determines a geographic region of interest. For the purposes of this specification, a "geographic region of interest" is defined as a geographic area about which a telecommunications terminal desires to stay informed. Advantageously, the geographic region of interest is based on:

1. the location of telecommunications terminal 102-*i* as ascertained in step 1302, or
2. the direction of motion (either instantaneous or time-averaged) of telecommunications terminal 102-*i* as ascertained in step 1302 (if telecommunications terminal 102-*i* is mobile), or
3. the speed (either instantaneous or time-averaged) of telecommunications terminal 102-*i* as ascertained in step 1302 (if telecommunications terminal 102-*i* is mobile), or
4. the priority of the geographically-sensitive message received in step 1301, or
5. the nature of desired content, or
6. any combination of i, ii, iii, iv, or v.

The purpose of basing the geographic region of interest on the location of telecommunications terminal 102-*i* is to assist telecommunications terminal 102-*i* in segregating geographically-sensitive messages that might be of relevance from those that are less likely to be of relevance. In other words, because the utility of a geographically-sensitive message is at least partially related to geography, basing the geographic region of interest on the location of telecommunications terminal 102-*i* assists telecommunications terminal 102-*i* in filtering out messages that are less likely to be of interest to a user of telecommunications terminal 102-*i*.

The purpose of basing the geographic region of interest on the direction of motion and speed of telecommunications terminal 102-*i* is to enable the size and shape of the geographic region of interest to be enlarged where telecommunications terminal 102-*i* is going on the theory that the user is more likely to be interested in information about where it is going than on where it has been.

The purpose of basing the geographic region on the priority of the geographically-sensitive message is to enable the size of the geographic region of interest to be enlarged for higher priority messages. For example, a user is likely to be more interested in high priority messages for regions that are far away than for lower priority messages.

As with respect to the geographic region of relevance definition message depicted in FIG. 7, a geographical region of interest in accordance with the illustrative embodiment is defined by:

1. a polygon, or
2. a conic section, or
3. a composite of at least one polygon and at least one ellipse.

Figure 14:
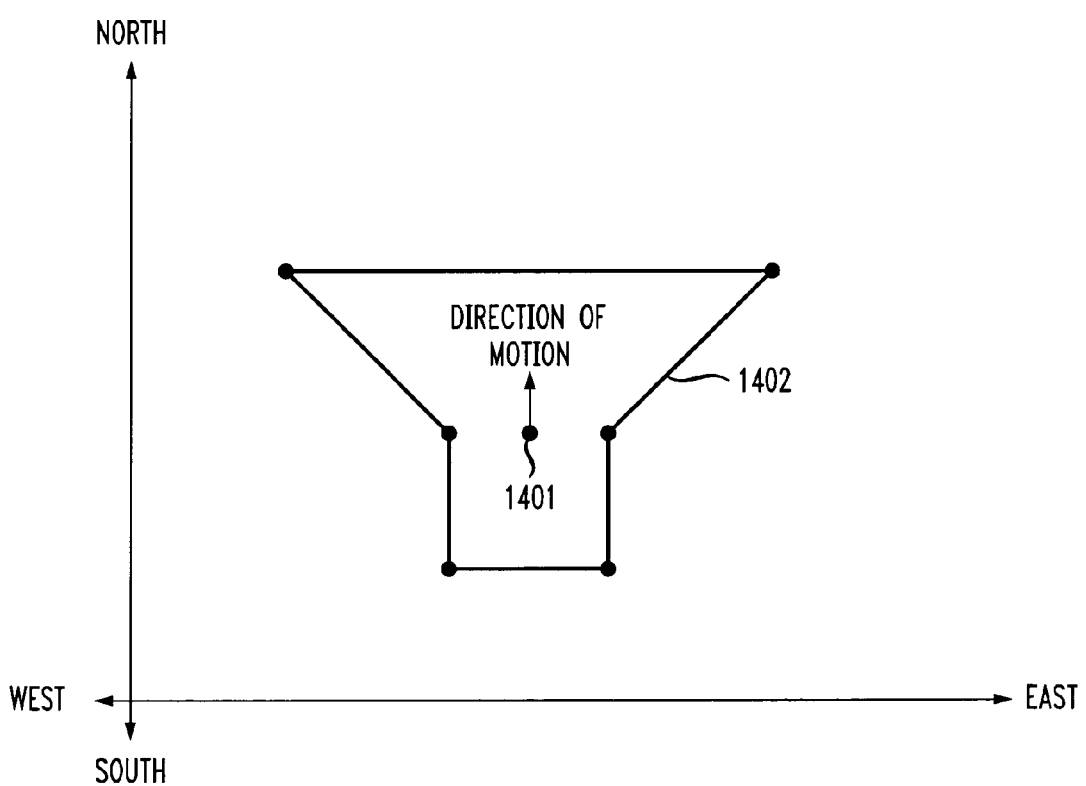
FIG. 14 depicts a map which includes an illustrative location of telecommunications terminal 102-$i$, location 1401, the northerly direction of motion of telecommunications terminal 102-$i$, and the perimeter of an illustrative geographic region of interest, geographic region of interest 1402.

FIG. 14 depicts a map which includes an illustrative location of telecommunications terminal 102-*i*, location 1401, the northerly direction of motion of telecommunications terminal 102-*i*, and the perimeter of an illustrative geographic region of interest, geographic region of interest 1402. As shown in FIG. 14, geographic region of interest 1402 is defined by a polygon that is enlarged in the direction of motion.

At step 1304, telecommunications terminal 102-*i* determines whether it should disregard the geographically-sensitive message received in step 1301 based on geographic considerations.

In accordance with the illustrative embodiment of the present invention, there are three variations of step 1304. The first variation is depicted below and with respect to FIG. 15. The second variation is depicted below and with respect to FIG. 16, and the third variation is depicted below and with respect to FIG. 17.

Figure 15:
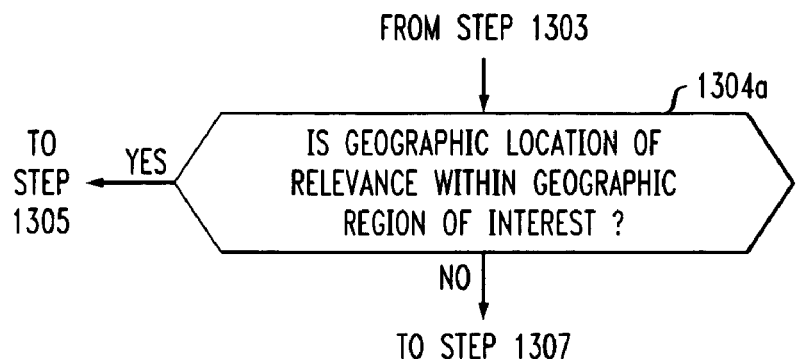
FIG. 15 depicts the first variation of step 1304.

FIG. 15 depicts the first variation of step 1304. In accordance with the first variation of step 1304, the geographically-sensitive message is associated with a geographic location of relevance, and, therefore, the relevant inquiry is whether the geographic location of relevance is within the geographic region of interest. If it is, then control passes to step 1305; otherwise, control passes to step 1307.

Figure 16:
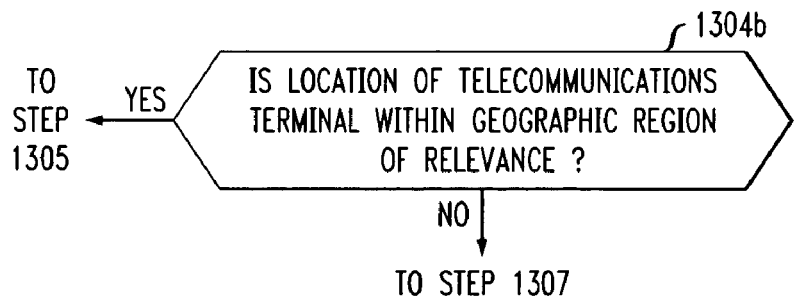
FIG. 16 depicts the second variation of step 1304.

FIG. 16 depicts the second variation of step 1304. In accordance with the second variation of step 1304, the geographically-sensitive message is associated with a geographic region of relevance and the relevant inquiry is whether the geographic location of telecommunications terminal 102-*i* is within the geographic region of relevance. If it is, then control passes to step 1305; otherwise, control passes to step 1307.

Figure 17:
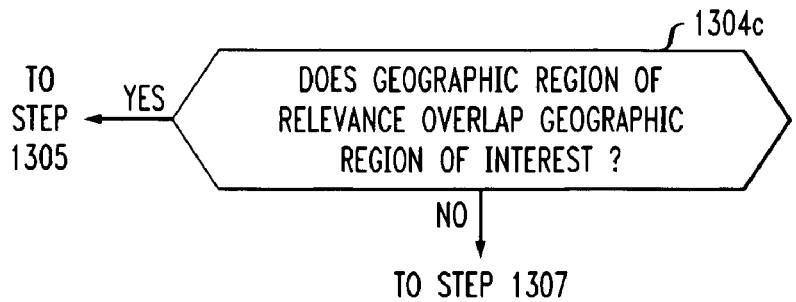
FIG. 17 depicts the third variation of step 1304.

FIG. 17 depicts the third variation of step 1304. In accordance with the third variation of step 1304, the geographically-sensitive message is associated with a geographic region of relevance and the relevant inquiry is whether the geographic region of relevance overlaps the geographic region of interest. If it is, then control passes to step 1305; otherwise, control passes to step 1307.

At step 1305, telecommunications terminal 102-*i* determines whether it should disregard the geographically-sensitive message received in step 1301 based on content considerations. To do this, telecommunications terminal 102-*i* compares the content designation associated with the geographically-sensitive message against a list of content types that the user of telecommunications terminal 102-*i* desires to receive. For example, Table 2 depicts an illustrative list of the content types that a user might desire to receive.

TABLE 2

List of Desired Content Types

Desired Content Types

Major League Baseball
Weather Reports
Stock Market Reports
Movie Reviews

When the list of content types is recited in positive terms (i.e., as a list of desired content types), then telecommunications terminal 102-*i* will disregard the geographically-sensitive message perfunctorily unless the content designation associated with the geographically-sensitive message is contained in the list of content types.

Alternatively, the list of content types might comprise a list of content types that a user might desire to avoid. For example, Table 3 depicts an illustrative list of the content types that a user might desire to avoid.

TABLE 3

List of Disfavored Content Types

Disfavored Content Types

Major League Baseball
Weather Reports
Stock Market Reports
Movie Reviews

When the list of content types is recited in negative terms (i.e., as a list of disfavored content types), then telecommunications terminal 102-*i* will disregard the geographically-sensitive message perfunctorily when the content designation associated with the geographically-sensitive message is contained in the list of content types.

Regardless of whether the list of content types is recited in either positive or in negative terms, if, because of content, the geographically-sensitive message is to be disregarded, control passes to step 1307. When, because of content, the geographically-sensitive message is not to be disregarded, telecommunications terminal 102-*i* control passes to step 1306.

At step 1306, telecommunications terminal 102-*i* preserves the geographically-sensitive message for presentation for a user of telecommunications terminal 102-*i*. Telecommunications terminal 102-*i* can present the geographically-sensitive message to the user immediately, or telecommunications terminal 102-*i* can store the geographically-sensitive message in memory 304 for later presentation. Furthermore, the geographically-sensitive message can overwrite in memory 304 older versions of the geographically-sensitive message. For example, a more recent geographically-sensitive message pertaining to the weather in a particular city can overwrite an older geographically-sensitive message pertaining to the weather in the same city.

Referring to step 1307 in FIG. 13, telecommunications terminal 102-*i* disregards the geographically-sensitive message.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A telecommunications terminal comprising:
a receiver for receiving a plurality of broadcasted geographically-sensitive messages having associated geographic locations of relevance and priorities, and for ascertaining a geographic location of said telecommunications terminal; and
a processor configured to determine a geographic region of interest of said telecommunications terminal based on said geographic location of said telecommunications terminal, to determine whether the geographic locations of relevance associated with the plurality of broadcasted geographically-sensitive messages are within said geographic region of interest of said telecommunications terminal, to filter out the broadcasted geographically-sensitive messages whose associated geographic locations of relevance are not within said geographic region of interest of said telecommunications terminal, and to order the unfiltered messages according to their associated priorities.

2. The telecommunications terminal of claim 1:
wherein said telecommunications terminal is mobile; and
wherein said geographic region of interest is based on said geographic location of said telecommunications terminal and on a direction of motion of said telecommunications terminal.

3. The telecommunications terminal of claim 1:
wherein said telecommunications terminal is mobile; and
wherein said geographic region of interest is based on said geographic location of said telecommunications terminal and on a speed of said telecommunications terminal.

4. The telecommunications terminal of claim 1 wherein said geographical region of interest is based on the associated priority of said geographically-sensitive message.

5. The telecommunications terminal of claim 1 wherein said geographic region of interest comprises at least one of a polygon and a conic section.

6. A method of operating a telecommunications terminal, said method comprising:
receiving a plurality of geographically-sensitive messages broadcasted to a plurality of telecommunication terminals, and the plurality of geographically-sensitive messages having associated geographic locations of relevance and priorities;
ascertaining a geographic location of said telecommunications terminal;
determining a geographic region of interest of said telecommunications terminal based on said geographic location of said telecommunications terminal;
determining whether the geographic locations of relevance are within said geographic region of interest of said telecommunications terminal;
filtering out the geographically-sensitive messages whose associated geographic locations of relevance are not within said geographic region of interest of said telecommunications terminal; and
ordering the unfiltered geographically-sensitive messages according to their associated priorities.

7. The method of claim 6:
wherein said telecommunications terminal is mobile; and
wherein said geographic region of interest is based on said geographic location of said telecommunications terminal and on a direction of motion of said telecommunications terminal.

8. The method of claim 6 wherein said telecommunications terminal is mobile; and
wherein said geographic region of interest is based on said geographic location of said telecommunications terminal and on a speed of said telecommunications terminal.

9. The method of claim 6 wherein said geographic region of interest is based on the associated priority of said geographically-sensitive message.

10. The method of claim 6 wherein said geographic region of interest comprises at least one of a polygon and a conic section.

11. A telecommunications terminal for filtering geographically-sensitive messages which are broadcasted to a plurality of telecommunication terminals, the telecommunication terminal comprising:
a receiver for receiving a first message having a definition of a geographic region of relevance and an associated indicium of the geographic region of relevance and for receiving a plurality of broadcasted geographically-sensitive messages, the plurality of broadcasted geographically-sensitive messages being labeled by the indicium of a geographic region of relevance;
means for ascertaining a geographic location of said telecommunications terminal; and
a processor configured to determine geographic regions of relevance from the associated indicia supplied in the plurality of broadcasted geographically-sensitive messages and to determine whether said geographic location of said telecommunications terminal is within the determined geographic region of relevance, and to filter out the broadcasted geographically-sensitive messages when said geographic location of said telecommunications terminal is not within a determined geographic region of relevance indicated by an associated indicium supplied in a broadcasted geographically-sensitive message.

12. The telecommunications terminal of claim 11 wherein said receiver is also for receiving a definition of said geographic region of relevance and an indicium, and further comprising a memory for storing said definition of said geographic region of relevance with an indicium of said geographic region of relevance as an index into said memory.

13. The telecommunications terminal of claim 11 wherein said geographic region of relevance comprises at least one of a polygon and a conic section.

14. A method of operating a telecommunications terminal to filter geographically-sensitive messages which are broadcasted to a plurality of telecommunications terminal, said method comprising:
receiving a first message having a definition of a geographic region of relevance and an associated indicium of the geographic region;
receiving a plurality of broadcasted geographically-sensitive messages having associated indicia of a geographic region of relevance;
ascertaining a geographic location of said telecommunications terminal;
determining a geographic region of relevance from the associated indicium supplied in a broadcasted geographically-sensitive message; and
determining whether said geographic location of said telecommunications terminal is within the determined geographic region of relevance; and
disregarding the broadcasted geographically-sensitive messages when said geographic location of said telecommunications terminal is not within the determined geographic region of relevance.

15. The method of claim 14 further comprising:
receiving a definition of each geographic region of relevance and an indicium of said geographic region of relevance before receiving said geographically-sensitive message; and
storing said definition of said geographic region of relevance into a memory with said indicium of said geographic region of relevance as an index into said memory.

16. The method of claim 14 wherein said geographic region of relevance comprises at least one of a polygon and a conic section.

17. A telecommunications terminal comprising:
a receiver for receiving a first message having a definition of a geographic region of relevance and an associated indicium of the geographic region of relevance and for receiving a plurality of broadcasted geographically-sensitive messages, the plurality of broadcasted geographically-sensitive messages having associated indicia of geographic regions of relevance and for ascertaining a geographic location of said telecommunications terminal; and
a processor configured to determine geographic regions of relevance from the associated indicia supplied in the plurality of broadcasted geographically-sensitive messages, to determine a geographic region of interest based on said geographic location of said telecommunications terminal, to determine whether said determined geographic regions of relevance overlap said geographic region of interest, and to filter out said broadcasted geographically-sensitive messages whose determined geographic regions of relevance fail to overlap said geographic region of interest.

18. The telecommunications terminal of claim 17:
wherein said telecommunications terminal is mobile; and
wherein said geographic region of interest is based on said geographic location of said telecommunications terminal and on a direction of motion of said telecommunications terminal.

19. The telecommunications terminal of claim 17 wherein said receiver is also for receiving a definition of said geographic region of relevance, and further comprising a memory for storing said definition of said geographic region of relevance and an indicium of said geographic region of relevance as an index into said memory.

20. The telecommunications terminal of claim 17:
wherein said telecommunications terminal is mobile; and
wherein said geographic region of interest is based on said geographic location of said telecommunications terminal and on a speed of said telecommunications terminal.

21. The telecommunications terminal of claim 17 wherein said geographic region of interest is based on a priority of said geographically-sensitive message.

22. The telecommunications terminal of claim 17 wherein said geographic region of interest comprises at least one of a polygon and a conic section.

23. A method of operating a telecommunications terminal, said method comprising:
receiving a first message having a definition of a geographic region of relevance and an associated indicium of the geographic region of relevance;
receiving a plurality of broadcasted geographically-sensitive messages having associated indicia of geographic regions of relevance;
ascertaining a geographic location of said telecommunications terminal;
determining geographic regions of relevance from the associated indicia supplied in the plurality of broadcasted geographically-sensitive messages;
determining a geographic region of interest of said telecommunications terminal based on said geographic location of said telecommunications terminal;
determining whether the determined geographic regions of relevance overlap said geographic region of interest of said telecommunications terminal; and
filtering out the broadcasted geographically-sensitive messages whose associated determined geographic regions of relevance fail to overlap said geographic region of interest of said telecommunications terminal.

24. The method of claim 23:
wherein said telecommunications terminal is mobile; and
wherein said geographic region of interest is based on said geographic location of said telecommunications terminal and on a direction of motion of said telecommunications terminal.

25. The method of claim 23 further comprising:
receiving a definition of said geographic region of relevance and an indicium of said geographic region of relevance before receiving said geographically-sensitive message; and
storing said definition of said geographic region of relevance into a memory with said indicium of said geographic region of relevance as an index into said memory.

26. The method of claim 23:
wherein said telecommunications terminal is mobile; and
wherein said geographic region of interest is based on said geographic location of said telecommunications terminal and on a speed of said telecommunications terminal.

27. The method of claim 23 wherein said geographic region of interest is based on a priority of said geographically-sensitive message.

28. The method of claim 23 wherein said geographic region of interest comprises at least one of a polygon and a conic section.

* * * * *

UNITED STATES PATENT AND TRADEMARK OFFICE
CERTIFICATE OF CORRECTION

PATENT NO. : 7,620,556 B1
APPLICATION NO. : 09/735335
DATED : November 17, 2009
INVENTOR(S) : Paul C. Ross Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1974 days.

Signed and Sealed this

Fourteenth Day of December, 2010

David J. Kappos
*Director of the United States Patent and Trademark Office*